United States Patent [19]

Quaas et al.

[11] Patent Number: 5,413,279
[45] Date of Patent: May 9, 1995

[54] VEHICLE HEATING

[75] Inventors: Hans-Reiner Quaas, Gröbenzell; Helmut Keinert, Nürtingen, both of Germany

[73] Assignee: J. Eberspächer, Esslingen, Germany

[21] Appl. No.: 95,813

[22] Filed: Jul. 2, 1993

Related U.S. Application Data

[63] Continuation of Ser. No. 761,348, Nov. 7, 1991, abandoned.

[30] Foreign Application Priority Data

Mar. 7, 1989 [DE] Germany .......................... 39 07 222.3
Dec. 29, 1989 [DE] Germany .......................... 39 43 335.8

[51] Int. Cl.⁶ .............................................. B60H 1/22
[52] U.S. Cl. ........................ 237/12.3 C; 237/12.3 A; 237/12.3 B; 123/142.5 R
[58] Field of Search ............... 237/12.3 A, 12.3 B, 237/2 A, 12.3 C; 126/110 B, 110 C; 123/142.5 R

[56] References Cited

U.S. PATENT DOCUMENTS 3,072,176  1/1963  Sunday ......................... 237/12.3 C Primary Examiner—Henry A. Bennet
Attorney, Agent, or Firm—McGlew and Tuttle

[57] ABSTRACT

A vehicle heating system characterized by a combined heating unit which contains a heater having a combustion gas/liquid heat exchanger and operating by burning liquid fuel, and a liquid/air heat exchanger in fluid flow communication therewith to supply heated air to warm the vehicle.

13 Claims, 4 Drawing Sheets

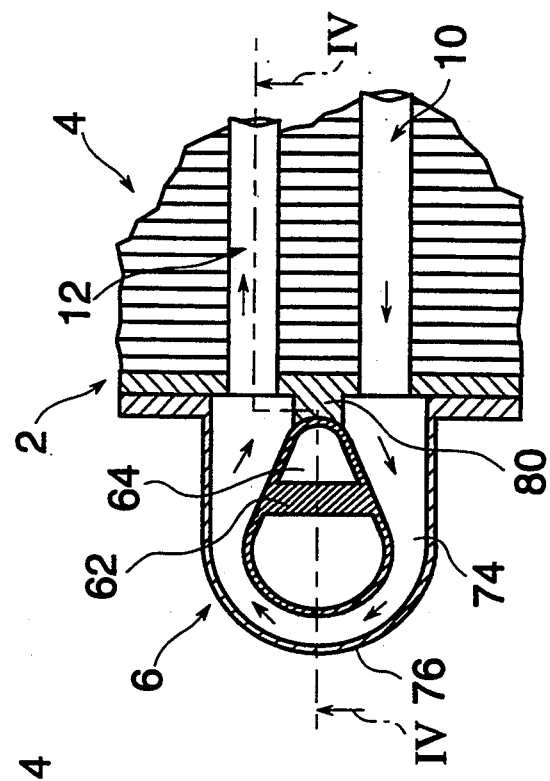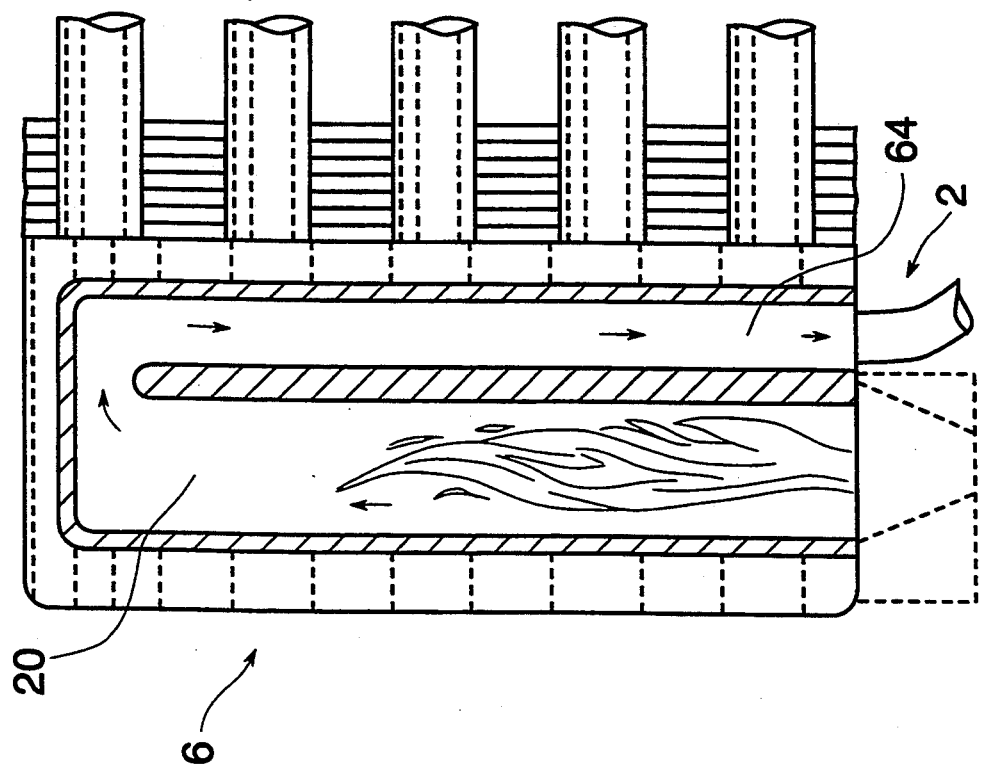

VEHICLE HEATING

This is a file wrapper continuation of application Ser. No. 07/761,348, filed Nov. 7, 1991, now abandoned.

FIELD AND BACKGROUND OF THE INVENTION

The invention relates to a vehicle heating system, comprising
(a) a heater having a combustion gas/liquid heat exchanger and operating by burning liquid fuel;
(b) and a liquid/air heat exchanger in fluid flow communication with said combustion gas/liquid heat exchanger to supply heated air to warm the vehicle.

SUMMARY OBJECTS OF THE INVENTION

Such a vehicle heating system is known for instance from the documents U.S. Pat. No. 4,700,888 and U.S. Pat. No. 3,758,031. In these documents the heater is provided at a location remote from the liquid/air heat exchanger and is connected to the latter via long liquid lines.

Furthermore, the document DE-A-37 18 611 reveals a vehicle heating system comprising a liquid/air heat exchanger connected to the engine coolant circuit, and a heater having a combustion gas/air heat exchanger, with the two heat exchangers being disposed separately one after the other in a channel for air to warm the vehicle.

The vehicle heating system according to the invention is characterized in that the liquid/air heat exchanger and the heater constitute a combined heating unit in which the liquid/air heat exchanger and at least part of the heater containing the combustion gas/liquid heat exchanger are combined.

The heating unit preferably comprises a combustion gas/liquid heat exchanger having a liquid passage annular space provided with flow deflecting means for generating a substantially helical liquid flow in the annular space. This optimizes the heat transfer conditions in the heater.

The heating unit or the heater, respectively, preferably has, in particular an integrated, liquid circulation pump for producing a liquid flow through the combustion gas/liquid heat exchanger and the liquid/air heat exchanger. This too serves to avoid longer flow distances for the heat carrier liquid.

The heater preferably is a heater having an integrated burner and an integrated combustion air fan. However, in the following, favorable alternative possibilities are indicated for separating the burner head of the heater and/or the combustion air supply of the heater.

The vehicle heating system according to the invention can be employed for vehicles of virtually any type, but in particular for vehicles having an internal combustion driving engine. Examples of vehicles in which the vehicle heating system according to the invention can be employed are: passenger cars, busses, lorries (for heating the driver's cabin and/or the loading space), caravans, recreational vehicles, construction vehicles, diggers, vehicle cranes, sailing yachts etc.

When the vehicle equipped with the vehicle heating system according to the invention is a vehicle having a internal combustion driving engine, the heating unit preferably is connected to the cooling liquid circuit of the vehicle. The heating unit is adapted to operate as a so-called auxiliary heating which, while the internal combustion driving engine is not running., supplies heat for heating the vehicle interior and/or for preheating the internal combustion engine prior to starting thereof. However, the heating unit may also be utilized as a supplementary heating which supplies additional heat in such operational conditions in which the internal combustion driving engine does not provide sufficient heat for heating the vehicle interior. Finally, the heating unit may be provided as the sole heating source, in particular in vehicles without internal combustion driving engine or in vehicles whose internal combustion driving engine is not utilized at all for supplying heat for heating purposes.

According to a particularly preferred development of the invention the cooling liquid circuit comprises a bypass line for establishing a short connection of the liquid outlet of the liquid/air heat exchanger to the liquid inlet of the heater, and a control valve for controlling the ratio of the liquid flow through the bypass line and through the internal combustion engine. It is possible to control by means of the control valve in what shares the heat carrier liquid flows back directly to the heater and to the internal combustion engine. A preferred mode of operation is a mode in which the heating unit is switched on a certain time before entering of the vehicle is intended, and the entire heat carrier liquid flow from the liquid/air heat exchanger is supplied again directly to the heater. After some time, part of this heat carrier liquid flow, before being fed back to the heater, will be supplied to the internal combustion driving engine in order to preheat the latter before the intended start thereof. This part may be increased to 100% immediately or after some time. The transition into the last-mentioned mode of operation, which may also take place with a gradual increase in the percentage of the heat carrier liquid flow to the internal combustion engine, can be controlled preferably by means of a suitable timer clock or on the basis of the temperature reached by the heat carrier liquid. For control on the basis of the heat carrier temperature, this temperature can be detected in particular at the transition from the heater into the liquid/air heat exchanger or at the exit of the liquid/air heat exchanger or at the entrance of the heater. A suitable means as control valve is a thermostatic valve.

In a further development of the invention, the liquid/air heat exchanger comprises two pipe rows arranged one after the other in the direction of air flow therethrough, the pipes of the front pipe row being connected to the pipes of the rear pipe row on a first side of the heat exchanger, and the heater is attached to the opposite, second side of the heat exchanger. The first side of the liquid/air heat exchanger located opposite the heater consequently is a pure liquid flow deflection side so that the heat carrier liquid circulates on the shortest conceivable way. Besides, the connections to the cooling liquid circuit of the internal combustion driving engine can be provided on the heater side of the heating unit without any problem.

A preferred, constitutionally particularly simple design of the assembly connection between liquid/air heat exchanger and heater is such that the heater has a flange and that an end plate of the liquid/air heat exchanger adjacent the heater is beaded about the flange.

According to a particularly preferred embodiment of the invention the heating unit has a constructional size corresponding essentially to, or being just slightly larger than, the constructional size of the liquid/air heat exchangers provided so far in motor vehicles for heating the passenger compartment. As a consequence thereof, the heating unit, in preferred manner, can be mounted in the vehicle at that location where the liquid-/air heat exchanger of the vehicle heating system is conventionally arranged.

For the fuel supply of the heating unit, there is preferably provided an intermediate tank which, during operation of the internal combustion engine, can be filled by means of the fuel pump thereof. This intermediate tank may be arranged in a higher position than the heating unit. Consequently, it is possible to utilize gravity supply of the fuel from the intermediate tank to the heating unit, for instance controlled by a magnetic valve, and a separate fuel supply pump for the heating unit can be dispensed with. The intermediate tank, which may have a capacity of for instance 1 to 5 l, is filled with fuel during operation of the internal combustion engine, preferably by way of the runback from internal combustion engine to the motor vehicle tank, as it is mostly provided anyway in internal combustion engines with injection system.

It is to be noted that the intermediate tank fuel supply described can also be employed in vehicle heaters that are not combined with the liquid/air heat exchanger so as to form a heating unit.

The heating unit according to the invention may be disposed in the air and distributor channel usually provided in a motor vehicle for ventilation, heating and air distribution. The liquid/air heat exchanger may have a fan associated therewith, preferably on the inflow side thereof. The ventilation and heating system can be equipped with a recirculation means so that the fan on the intake side is selectively in connection with outside air or air inside the vehicle. The ventilation and heating system may have a vehicle air conditioning system integrated therein. Or the heating unit according to the invention may be integrated in a vehicle air conditioning system.

The invention provides furthermore a fuel-operated heat exchanger heating system for motor vehicles, comprising:

a fan whose blower is connected on the intake side selectively either to. outside air (fresh air) or vehicle inside air (recirculating air);

a heat exchanger fed by the cooling circuit of the motor and disposed within an air and distributor channel on the discharge side of. the blower;

an air guiding and distributing system which is fed with fresh air directly by the fan or with warm air indirectly by the fan with the interposition of the heat exchanger and which opens into the interior of the motor vehicle, characterized in that, instead of the heat exchanger provided on the vehicle side, there is provided a fuel-operated heater between the fan and the ventilation guiding and distributing system, which is integrated in the heat exchanger and comprises a combustion chamber, with the heat generated by combustion of a fuel air mixture in the combustion chamber being transferred to the water of the cooling circuit of the motor circulating through the heat exchanger around which the air flow produced by the fan circulates directly. The air is thereby heated and conveyed to the vehicle interior.

The vehicle interior of a motor vehicle usually is separated from the engine compartment of the motor vehicle by a sheet metal wall, the so-called splashboard. It is possible to arrange the burner head of the heating unit and/or the combustion air fan of the heating unit on the side of the splashboard facing away from the passenger compartment, in spatially slightly separated manner from the heating unit proper.

BRIEF DESCRIPTION OF THE DRAWINGS

The invention and developments of the invention will be elucidated in more detail in the following by way of embodiments shown in the drawings in which

FIG. 4 is a sectional view of a second embodiment of a heating unit as seen longitudinally of the combustion chamber axis;

FIG. 5 is a cross-sectional view of the heating unit of FIG. 4;

DETAILED DESCRIPTION OF THE PREFERRED EMBODIMENT

Figure 1:
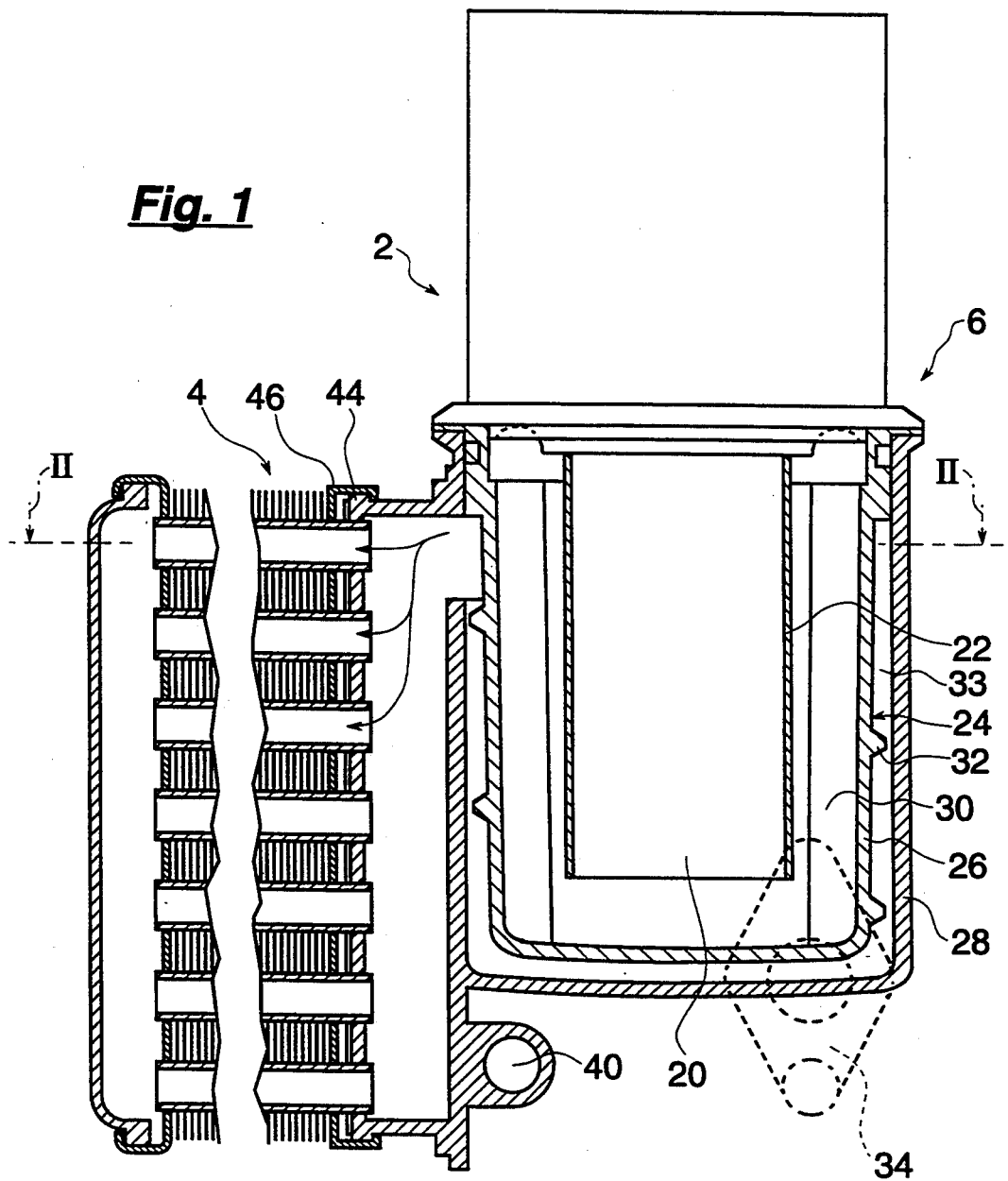
FIG. 1 is a vertical section through a heating unit.
Figure 2:
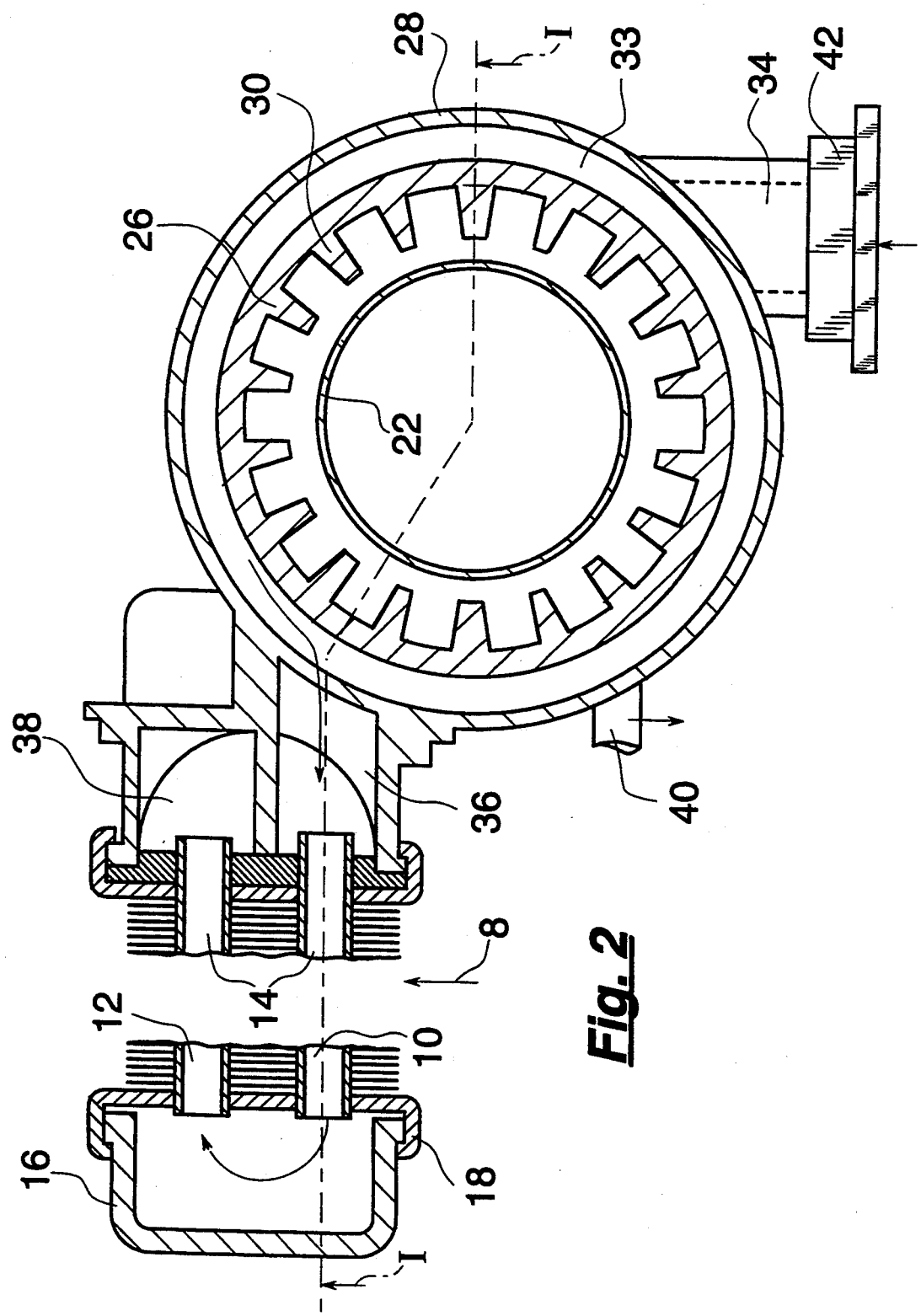
FIG. 2 is a horizontal section through the heating unit of FIG. 1.

The heating unit 2 depicted in FIGS. 1 and 2 consists of a liquid/air heat exchanger 4 and a heater 6 that is attached directly thereto in unitary manner and generates heat by the combustion of petrol or diesel oil. Air flows through heat exchanger 4 in accordance with arrow 8 and the air heated in heat exchanger 4 is fed into the passenger compartment of the passenger car to be heated. The air flow through the heat exchanger 4 is effected due to the dynamic pressure created at corresponding air entrance locations while the vehicle is in motion, and/or by a fan associated with the heat exchanger 4. It may be provided that the heating system of the motor vehicle has a so-called recirculation position such that in this position the air is not sucked in from the outside, but from the interior of the motor vehicle and is passed to the heat exchanger 4.

The heat exchanger 4 comprises, one behind the other in the direction of air flow therethrough, a front pipe row 10 and a rear pipe row 12, each pipe row 10, 12 containing several horizontal pipes 14 on top of each other. All pipes 14 are interconnected by thin sheet metal ribs. Liquid flows through the pipes 14 of the front pipe row 10—as seen in the direction of FIGS. 1 and 2—from right to left, while the liquid flows through the pipes 14 of the rear pipe row 12 from left to right. The heat exchanger 4, on its left-hand, first side in FIGS. 1 and 2, has a water box 16 extending across the height of the heat exchanger 4. Water box 16 is constituted by an elongated, trough-like plastics part secured to the heat exchanger 4 by means of a beaded rim of an adjacent end plate 18. The pipes of the front pipe row 10 are in flow communication with the pipes of the rear pipe row 12 through the interior of the water box 16.

As regards the heater 6, the drawing shows in detail only the lower end portion of a combustion chamber 20 that is surrounded by downwardly open pipe 22, a combustion gas/liquid heat exchanger 24 as well as various liquid passages to be described hereinafter. The upper portion of the heater 6 is only schematically outlined. This portion essentially includes a combustion air fan, the upper portion of combustion chamber 20, a means for introducing liquid fuel in the combustion chamber in finely distributed manner, and an ignition means. The heater 6 is supplied with fuel for instance by means of an integrated pump or a pump mounted in spaced manner therefrom. Except for the design of the transition to the liquid/air heat exchanger 4, the heater 6 is a conventional heater as used for instance in motor vehicle auxiliary heating systems already distributed so far.

The combustion gas/liquid heat exchanger 24 essentially consists of a metal part 26 having the shape of a vertically elongate, downwardly closed pot slid onto pipe 22 from the bottom, and of an outer jacket 28 of similar, and just slightly larger shape that is slid onto the latter. The metal part has on its inside vertically extending ribs 30 distributed across the circumference of said metal part 26. On the outside, the metal part 26 has a helically extending rib 32 on whose outside the outer jacket 28 abuts with its substantially cylindrical inside surface.

In the lower portion of the heater 6, there is located a liquid supply tube 34 opening into the liquid space between metal part 26 and outer jacket 28. A liquid transfer passage 36 extends away from this liquid space in the upper region of the heat exchanger 24. Due to the flow guiding rib 32, a substantially helical liquid flow from the bottom upwardly takes place in the substantially cylindrical annular space between metal part 26 and outer jacket 28.

The liquid transfer passage 36, laterally of the heat exchanger 24, changes it a vertical path and has a length in vertical direction corresponding to the height of the first pipe row 10. The pipes 14 of the first pipe row 10 are open towards the liquid transfer passage 36 on their right-hand ends.

The heater 6 comprises furthermore a liquid discharge passage 38 extending vertically parallel to the liquid transfer passage 36, with the right-hand ends of the pipes 14 of the rear pipe row 12 opening into the interior of said passages 38. The liquid discharge passage 38 is closed at the top and merges in a liquid discharge tube 40 at the lower end. An electrically driven circulation pump 42, shown schematically, is provided on the liquid supply tube 34.

The walls of the liquid transfer passage 36 and of the liquid discharge passage 38, on their sides facing the liquid/air heat exchanger 4, are provided with a flange 44 which, seen as a whole, is of substantially rounded rectangular configuration. A right-hand end plate 46 has its edge beaded about this flange 44, the heater 6 and the heat exchanger 4 being thereby assembled in unitary manner so as to directly form a heating unit 2.

Modern heaters 6 are so compact in terms of space that the heating unit 2 is not significantly larger than the space provided so far in motor vehicles for solely a liquid/air heat exchanger. Consequently, the heating unit 6 can be accommodated in this mounting space which optionally is slightly increased in newly developed vehicle models. Depending on the order of the future car owner, it is possible to install selectively either a "normal" liquid/air heart exchanger or a heating unit 2 consisting of heater 6 and heat exchanger 4.

Figure 3:
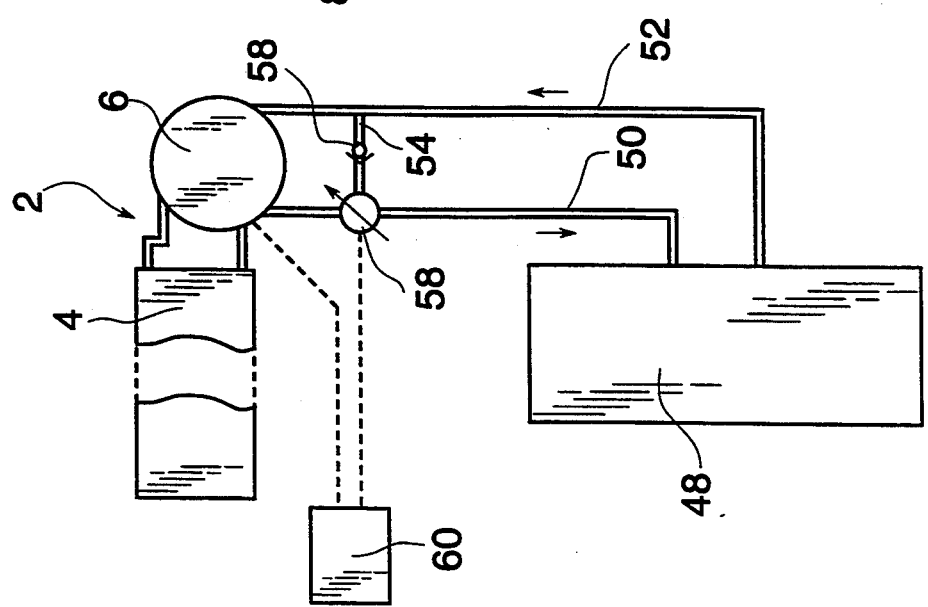
FIG. 3 is a view illustrating the integration of the heating unit of FIGS. 1 and 2 in the cooling liquid circuit of an internal combustion driving engine of a motor vehicle.

FIG. 3 shows a general view of the entire vehicle heating system, including the internal combustion driving engine 48. The liquid discharge tube 40 of heating unit 2 is connected via a line 50 to the internal combustion engine 48, and the liquid supply tube 34 of heating unit 2 is connected to the internal combustion engine 48 via a line 52. Internal combustion engine 48 comprises a liquid pump, not shown. Between the ends of lines 50 and 52, the liquid flows through cylinder block, cylinder head and liquid pump of the internal combustion engine 48.

FIG. 3 reveals furthermore a bypass line 54 leading close to the heater 6 from the liquid discharge tube 40 and the line 50, respectively, to the liquid supply tube 34 and the line 52, respectively. At the first-mentioned branch of the bypass line 54, there is located a threeway thermostatic valve 56. A check valve 58 is arranged in bypass line 54 such that flow through said bypass line 54 is possible only from left to right as seen in FIG. 3.

When the heater 6 is started and the liquid in the entire liquid system is still cold, the thermostatic valve 56 is in a position in which the entire liquid flow coming from the heat exchanger 4 is fed again to the heater 6 on the shortest possible way, through the bypass line 54. Consequently, the heat generated in the heater 6 is concentrated on heating the passenger compartment. When, after certain time of operation, the temperature of the liquid in this short circuit has reached a predetermined threshold value, for instance approx. 85° as measured at the liquid discharge tube 40 or at the location of the thermostatic valve 56, respectively, the thermostatic valve 56 gradually changes such that an increasing share of the liquid from the liquid discharge tube 40 does not flow into bypass line 54 but into line 50. In this manner, the internal combustion engine 48 is preheated prior to starting thereof. It is nevertheless ensured that the liquid heated by heater 6 at first flows through the heat exchanger 4 and that, the is, part of the thermal content of the liquid continues to be available for heating the vehicle interior.

It is recognizable that the vehicle heating system shown in the drawings is also operable when the internal combustion engine 48 is running and, thus, in a heat-generating mode. In this case, the heater 6 operates as a supplementary heater. However, it should be ensured for this mode of operation that the thermostatic valve 56, irrespective of the temperature of the liquid, permits at least a minimum amount of liquid to flow to line 50. The heater 6 may also be switched off completely then.

It is emphasized that the thermostatic valve 56 does not necessarily have to be positioned at the location shown in the drawing. It may alternatively also be located at the entrance of the bypass line 54 into line 52 or into liquid supply tube 54, respectively. Instead of the illustrated three-way valve 56, it is also possible to provide in line 50 or bypass line 54 or line 52 a simpler valve that is controllable to assume more opened or more closed positions. In all of these various modifications the afore-described function is retained in analogous manner.

It is pointed out furthermore that, instead of the thermostatic valve, a valve controlled in response to temperature may be provided, employing external temperature measurement at an appropriate location of the liquid circuit.

In addition thereto, a time control unit 60 is shown which allows presetting especially of the start of the heater, for instance for a specific period of time prior to an intended time of departure. A valve positioned at the described location of the thermostatic valve 56 or at the locations of the liquid circuit described as alternative modifications is connected to the time control unit 60.

By means of the time control unit 60, this valve is controlled to gradually change position, as described hereinbefore, for instance 10 to 30 min after start of the heater 6. This time control of the valve may be combined with the afore-described temperature control of the valve.

Figure 6:
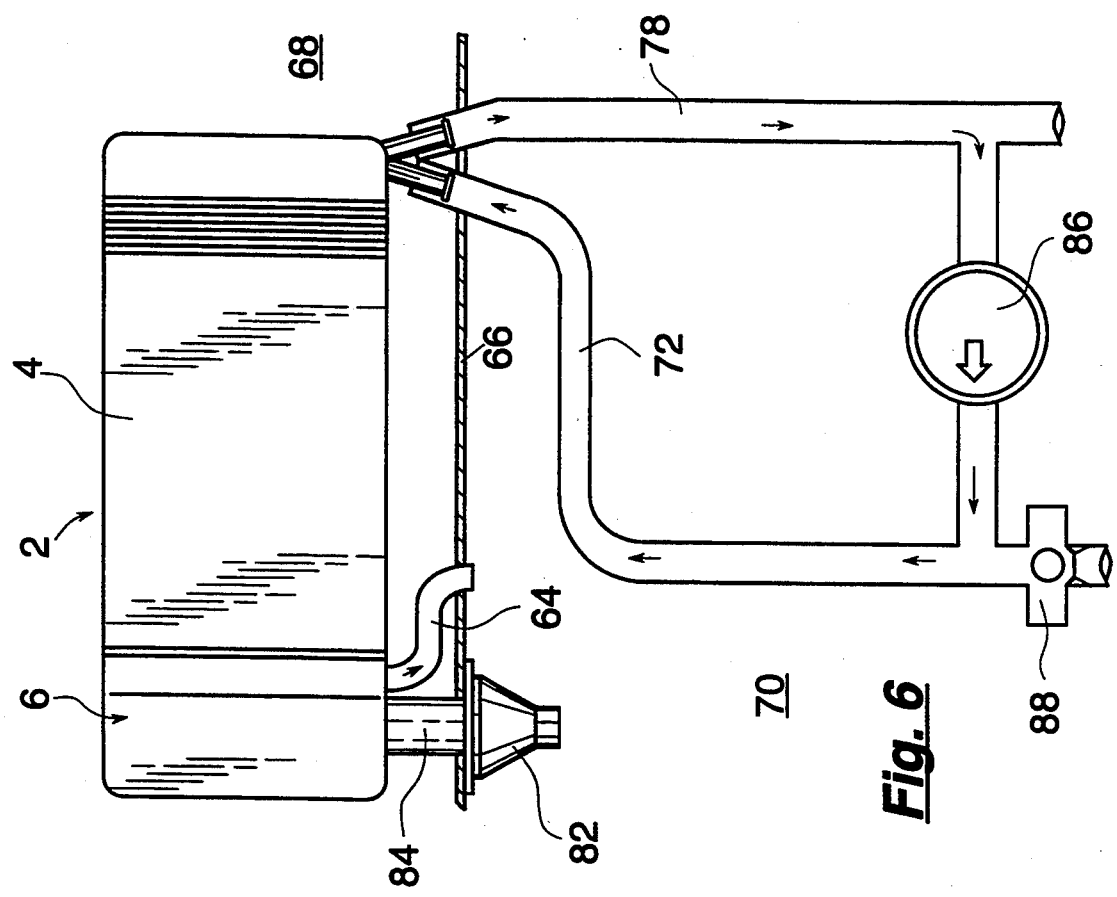
FIG. 6 is a view illustrating the spatial arrangement of the heating unit of FIGS. 4 and 5 in a motor vehicle.

The heating unit 2 shown in FIGS. 4, 5 and 6 comprises a liquid/air heat exchanger 4 and a heater 6. The combustion chamber 20 of the heater 6, as seen in cross-section transversely of the longitudinal axis of the heater 6, has the shape of a circle with a plane partition 62 on one side. Beyond the partition 62, an exhaust gas duct 64 of substantially triangular to trapezoidal cross-section extends parallel to combustion chamber 20. The exhaust gases flow through the exhaust gas duct 64 in the opposite flow direction to the flow direction of the combustion gases in combustion chamber 20. The combustion gases of the heating unit 2 leave the heating unit 2 through a line 64 which is passed to the outside through a splashboard 66 between the passenger compartment 68 and the engine compartment 70 of the vehicle.

The front pipe row 10 of the liquid/air heat exchanger 4 is fed with liquid via a line 72 from the engine compartment 70 of the motor vehicle, as shown on the righthand side in FIGS. 4 to 6. On the left-hand side, the pipes of the front pipe row 10 open into a circulation space 74 of the heater 6 which is provided between the wall of the combustion chamber 20 and the exhaust gas duct 64, respectively, and a jacket 76 of the heater 6 which is of substantially extended semi-cylindrical configuration. After having flown through the circulation space 74 the liquid enters the left-hand ends of the pipes of the rear pipe row 12. At the right-hand end of the rear pipe row 1 the liquid leaves heat exchanger 4 and enters a line 78 which is passed into the engine compartment 70 through said splashboard 66. The circulation space 74, at the location where the heater 6 adjoins the heat exchanger 4, is subdivided by a wall 80 so that the liquid from the front pipe row 10 circulates through the circulation space 74, changing its direction by approx. 180°, and then enters the rear pipe row 12.

FIG. 6 reveals furthermore that the burner head 82 of the heater 6, which contains the fuel introduction into the combustion air and the ignition means, for instance a spark plug, is disposed on the side of the splashboard 66 facing the engine compartment and is connected via a short pipe 84 to the combustion chamber 20 of the heater. A fan for providing combustion air may be integrated in the burner head 82 or may be arranged a certain distance away from the burner head 82.

FIG. 6 illustrates furthermore that line 78 is connected to line 72 via an electrically driven pump 86. By means of the pump 86 the liquid can be circulated in the circuit through the heater 6 and the heat exchanger 4. Line 78 as well as line 72 furthermore are connected to the cooling liquid system of the internal combustion engine of the motor vehicle, with a check valve 88 being arranged in line 72 between the entrance of a line coming from pump 86 and the internal combustion engine, so that a flow through line 72 is possible only in the direction from the internal combustion engine to the heating unit 2. In this manner, the heating unit 2 can be selectively operated either with heat supply from the internal combustion engine only, with heat supply from the heater 6 only, or with heat supply from the combination thereof.

In front of or behind the heat exchanger 4, there is provided a fan, not shown, for blowing air heating up on its passage through the heat exchanger 4 into the passenger compartment.

The described system, in terms of electricity, is operated by the battery provided in the vehicle. Operation is started either by means of a simple switch or via a programmable timer clock. The system has an independent control, a circulation pump for the water circuit, and a supply unit (fuel, combustion air).

We claim:

1. A vehicle heating system comprising:
    a heater operating by burning fuel and generating combustion gas, said heater including a combustion gas/liquid heat exchanger to transfer heat from said combustion gas to a liquid;
    a liquid/air heat exchanger connected with said combustion gas/liquid heat exchanger to receive said liquid from said combustion gas/liquid heat exchanger and to transfer heat from said liquid to air to warm the vehicle, a portion of said liquid/air heat exchanger being combined with a portion of said combustion gas/liquid heat exchanger to form a signal heating unit, said liquid/air heat exchanger and the heater is connected to the cooling liquid circuit of an internal combustion driving engine of the vehicle, said cooling liquid circuit comprises a by-pass line for providing a short connection of a liquid outlet of the liquid/air heat exchanger to a liquid inlet of the heater, and a control valve for controlling the ratio of the liquid flow to the by-pass line and through the internal combustion engine.

2. A vehicle heating system comprising:
    a heater operating by burning fuel and generating combustion gas, said heater including a combustion gas/liquid heat exchanger means for transferring heat from said combustion gas to a liquid;
    liquid/air heat exchanger means positioned adjacent and attached to said combustion gas/liquid heat exchanger means, and for receiving said liquid from said combustion gas/liquid heat exchanger means and for transferring heat from said liquid to air to warm the vehicle.

3. A vehicle heating system according to claim 2, wherein said combustion gas/liquid heat exchanger comprises a liquid passage annular space providing a substantially helical guidance of a liquid flow in the annular space.

4. A vehicle heating system according to claim 2, further compromising: a liquid circulation pump for producing a liquid flow through the combustion gas/liquid heat exchanger and the liquid/air heat exchanger.

5. A vehicle heating system according to claim 2, wherein said liquid/air heat exchanger and the heater is connected to the cooling liquid circuit of an internal combustion driving engine of the vehicle.

6. A vehicle heating system according to claim 5, wherein said cooling liquid circuit comprises a bypass line for providing a short connection of a liquid outlet of the liquid/air heat exchanger to a liquid inlet of the heater, and a control valve for controlling the ratio of the liquid flow through the bypass line and through the internal combustion engine.

7. A vehicle heating system according to claim 6, wherein said control valve is a valve responsive to the temperature of the liquid at a temperature measurement location of the cooling liquid circuit.

8. A vehicle heating system according to claim 5, wherein said control valve is a time controlled valve.

9. A vehicle heating system according to claim 2, wherein said heater has a flange and is assembled in a unitary manner to the liquid/air heat exchanger by means of an end plate of the liquid/air heat exchanger which is beaded about said flange.

10. A vehicle heating system according to claim 5, wherein said heater is mounted at that location of the vehicle where the liquid/air heat exchanger of the vehicle heating system is conventionally disposed.

11. A vehicle heating system according to claim 5, further comprising an intermediate tank for supplying the heater with fuel during operation of the internal combustion engine, said intermediate tank being adapted to be filled by a fuel pump thereof.

12. A vehicle eating system according to claim 11, wherein said intermediate tank is disposed in a higher position than the heater.

13. A vehicle heating system in accordance with claim 2, wherein:
 said liquid/air heat exchanger includes two (2) pipe rows arranged one after the other in a direction of air flow therethrough, the pipes of a front row being connected to the pipes of a rear pipe row on a first side of said liquid/air heat exchanger;
 said combustion gas/liquid heat exchanger being attached to a second side of said liquid/air heat exchanger, said second side being substantially opposite said first side.

* * * * *